W. P. DILLMAN.
Harvester Rake.

No. 70,976. Patented Nov. 19, 1867.

United States Patent Office.

WILLIAM P. DILLMAN, OF JOLIET, ILLINOIS.

Letters Patent No. 70,976, dated November 19, 1867.

IMPROVEMENT IN HARVESTER-RAKES.

*The Schedule referred to in these Letters Patent and making part of the same.*

TO ALL WHOM IT MAY CONCERN:

Be it known that I, WILLIAM P. DILLMAN, of Joliet, of the county of Will, and State of Illinois, have invented a new and useful Improvement in Harvester-Rakes; and I do hereby declare that the following is a full and exact description thereof, reference being had to the accompanying drawings, and to the letters of reference marked thereon.

The nature of my invention consists in providing the table upon which the cut grain falls with an arrester, which extends nearly across the table, from the grain side thereof.

The object of this arrester is to arrest the cut grain in its fall, and prevent it from falling directly on the rake-head, and to hold the grain in such a position as to be readily acted upon by the rake.

Figure 1:
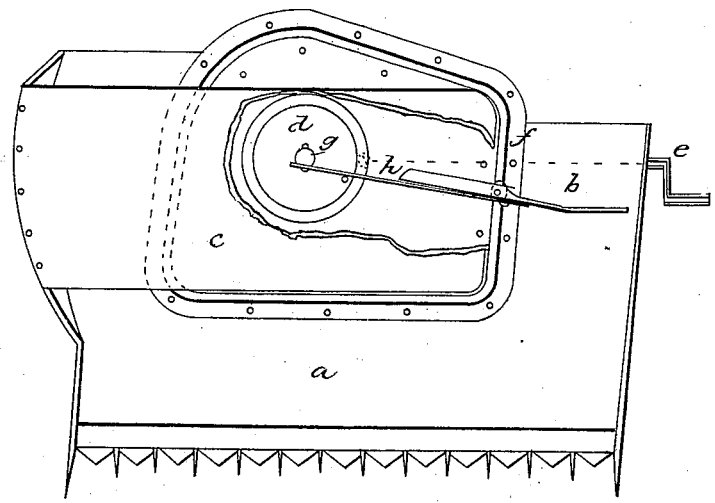
Figure 2:
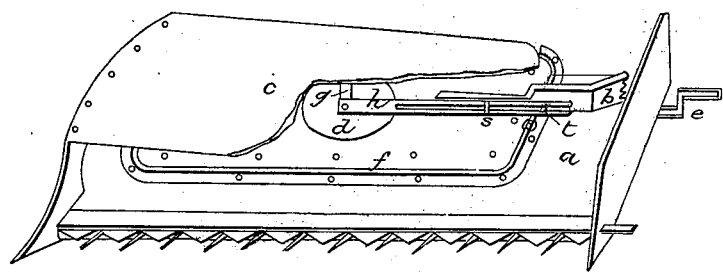
Figure 3:
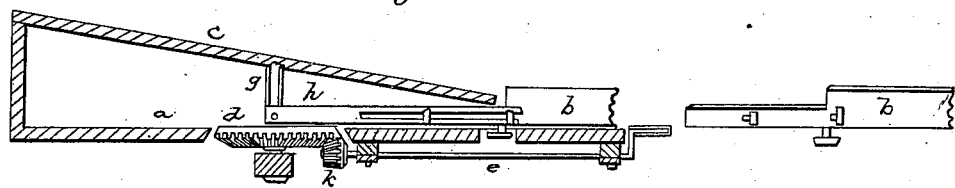

Figure 1 represents a top view.
Figure 2, a perspective view.
Figure 3, a side elevation.
Similar letters of reference refer to similar parts in the different figures.

$a$ is the table which receives the cut grain. $b$ is the rake-head. $h$ is the arm, attached to the revolving standard $g$. $e$ is the shaft which communicates the motion from the main driving-wheel to the rake. $c$ is the arrester, which arrests the cut grain in its fall from a perpendicular to a horizontal position. $f$ is the guide-track, which gives the proper course to the rake-head.

The operation of my invention is as follows: Motion is communicated to the rake by means of the shaft $e$, which in turn acts upon the cog-wheels $k$ and $d$, thence upon the upright shaft $g$ and the arm $h$. The arm $h$ is slotted, and in which slot the rake $b$ acts, by means of the keys $s$ and $t$. The arm $h$, as it revolves, carries with it the head $b$, and the proper course is given to the rake by means of the guide-track $f$.

The arrester $c$ passes from the grain-side of the table to the opposite side, saving space enough for the rake-head to pass with the gathered grain. The arrester is so placed as to incline towards the side where the grain is delivered from the table, and also towards the front of the table. The grain, as it falls, strikes upon this arrester, which holds it in a favorable position for the rake to gather it into a sheaf; and at the same time it prevents the falling grain from falling upon the rake-head as it passes across the table; hence no grain is tangled from this source.

The guide-track $f$ is made in the table, but it can be as well made by adjusting it to the top of the table, and thus not cut away any portion of the table. The guide-track $f$ is made irregular, and is not of uniform distance from the central shaft $g$. By this means I am able to have the rake-head $b$ travel parallel with the finger-bar in such a way as to gather all the cut grain into a sheaf.

Having thus described my invention, what I claim as new, and desire to secure by Letters Patent, is—

1. The arrester $c$, attached to the outer grain-guard of the platform, and inclined towards the inner end of said platform.

2. A grain-arrester, so constructed that the revolving rake passes under its outer end.

3. The arrester $c$, constructed as described, in combination with the rake $b$, or its equivalent.

WM. P. DILLMAN.

Witnesses:
    THOS. H. HUTCHINS,
    OBED LONG.